United States Patent
Meldrum et al.

[15] 3,706,586
[45] Dec. 19, 1972

[54] METHOD OF PRODUCING A PEARLESCENT BASIC LEND CARBONATE PIGMENT

[72] Inventors: David R. Meldrum, Englishtown, N.J.; Frank J. Eckert, Marrisville, Pa.

[73] Assignee: Cities Service Company, New York, N.Y.

[22] Filed: Dec. 11, 1970

[21] Appl. No.: 97,351

[52] U.S. Cl. ..........................106/291, 23/68, 23/70, 106/297
[51] Int. Cl. ............................C09c 1/00, C09c 1/14
[58] Field of Search ............106/291, 297; 23/68, 70

[56] References Cited

UNITED STATES PATENTS

| | | | |
|---|---|---|---|
| 2,097,269 | 10/1937 | Brossman | 106/297 X |
| 2,807,858 | 10/1957 | Livingston | 23/70 |
| 2,950,981 | 8/1960 | Miller et al. | 106/291 X |
| 3,150,927 | 9/1964 | Walsh | 23/70 |
| 3,230,037 | 1/1966 | Kunz | 106/297 X |

FOREIGN PATENTS OR APPLICATIONS

| | | | |
|---|---|---|---|
| 954,944 | 4/1964 | Great Britain | 23/68 |

OTHER PUBLICATIONS

Chemical Abstracts, Vol. 59, g. 9619 (1963)
Chemical Abstracts, Vol. 32, g. 3104 (1938)
Chemical Abstracts, Vol. 55, g. 14035i–4036a (1961)
Corres. Art from Angen. Chem. Vol. 72, pg. 622 (1960)

*Primary Examiner*—H. Sneed
*Attorney*—J. Richard Geaman

[57] ABSTRACT

A pearlescent pigment consisting of hexagonal platelets of basic lead carbonate is produced by bubbling carbon dioxide gas into an aqueous solution of a basic lead salt which is derived from the reaction of lead monoxide with an acid. The acid that is reacted with the lead monoxide can be nitric acid, but more preferably will have the general formula:

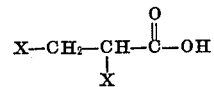

wherein X is a member from the group consisting of hydrogen, methyl and halogen. Reaction of the carbon dioxide with the basic lead salt is carried out in the presence of dimethylsulfoxide (DMSO) which is dissolved in the aqueous reaction medium, thus facilitating control over the rate and extent of crystal initiation and growth. The resulting basic lead carbonate pigment can be incorporated into plastics, lacquers, and the like to provide articles having the appearance of natural pearl.

14 Claims, No Drawings

3,706,586

METHOD OF PRODUCING A PEARLESCENT BASIC LEND CARBONATE PIGMENT

BACKGROUND OF THE INVENTION

This invention relates to nacreous or pearlescent pigments. More specifically it relates to basic lead carbonate pigments having luster and brilliance that equals or excells that of natural pearl essence.

The term "pearl essence" refers to a composition prepared from the minute guanine and hypoxanthine crystals which are extracted from the skin and scales of certain fish. This "natural pearl essence" can be incorporated into nitrocellulose or methyl methacrylate to provide artificial pearls or buttons, jewelry, decorative finishes, and the like which resemble real pearls or mother-of-pearl. Since the recovery of natural pearl essence is a lengthy and very costly process, it has in the large part been replaced by synthetically produced pigments such as basic lead carbonate and bismuth oxychloride. All such pigments, whether natural or synthetic, are referred to a "pearlescent" or "nacreous" pigments.

The most popular synthetic pearlescent pigment is basic lead carbonate which is precipitated by passing carbon dioxide gas into an aqueous solution of a basic lead salt which has been formed by reacting lead monoxide, or litharge, with an aqueous solution of an acid, and the term "basic lead salt" as used herein thus refers to a double salt of lead. For instance, reaction of litharge with an aqueous solution of nitric acid produces an aqueous solution of a basic lead salt having the formula:

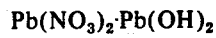

$$Pb(NO_3)_2 \cdot Pb(OH)_2$$

Reaction of litharge with an aqueous solution of acetic acid produces an aqueous solution of a basic lead salt having the formula:

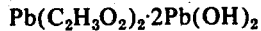

$$Pb(C_2H_3O_2)_2 \cdot 2Pb(OH)_2$$

Corresponding double salts of lead are produced by reaction of litharge with still other acids. Basic lead salts, therefore, have the general formula:

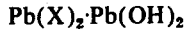

$$Pb(X)_2 \cdot Pb(OH)_2$$

where X is representative of the anion of the water soluble acid which is reacted with the lead monoxide.

Pearlescent basic lead carbonate crystals consist of $3CO_3 \cdot 2Pb(OH)_2$ or $2PbCO_3 \cdot Pb(OH)_2$ or a mixture of both. In precipitating the basic lead carbonate pigment, conditions are established and maintained in an attempt to provide hexagonal crystalline platelets that are characterized by clarity, or transparency, and platelet dimensions that are essential in providing a maximum pearlescent effect. Heretofore, optimum platelet dimensions for a pearlescent basic lead carbonate pigment have been specified as being about 5 to about 50 microns in diameter and about 10 to about 50 millimicrons in thickness. It will be appreciated that these specifications apply to pigments which are a mixture of platelets having widely different diameters and thicknesses within these ranges, rather than being applicable to a number of grades of the pigment wherein the platelet dimensions are relatively uniform in each grade, but insignificantly different from one grade to the next.

Broad specifications on platelet size have been necessary heretofore since it has not been possible to finely control the rate and extend of the crystal growth of basic lead carbonate, and as a result the crystal platelets which were produced have been characterized by a broad range of diameters and thicknesses.

SUMMARY OF THE INVENTION

The present invention is based on the discovery that the reaction which occurs when carbon dioxide is bubbled into an aqueous solution of a basic lead salt, for production of pearlescent basic lead carbonate pigment, has heretofore been largely uncontrolled because of reaction of the carbon dioxide with the salt at a nonuniform rate, and as a result it has not been possible to produce pearlescent pigments of basic lead carbonate which are characterized by relatively uniform platelet dimensions.

In accordance with the present invention dimethylsulfoxide (DMSO) is added, usually in small amounts, to the aqueous reaction medium in which the carbon dioxide is reacted with the basic lead salt. By carrying out the reaction in the presence of DMSO, the resulting crystal platelets of basic lead carbonate are more uniform in size and have dimensions within a range which is necessary to provide a pigment of high quality.

The function of the DMSO in aiding the reaction is not clearly understood, and although not wishing to be bound by theory, it is conjectured that it may increase the solubility of the carbon dioxide in the aqueous reaction medium and thereby provide a greater amount of dissolved carbon dioxide for reaction with the dissolved salt. In prior methods there has been a tendency for the reaction to be localized in the region where the carbon dioxide first enters the salt solution as bubbles. More specifically, the reaction tends to proceed very rapidly at the interface of the gas bubble and the solution, and at somewhat slower rates in other regions of the solution wherein the carbon dioxide exists in a dissolved state. As a consequence of this nonuniform reaction rate throughout the reaction medium, it has not been possible to produce pearlescent pigments of basic lead carbonate which are characterized by relatively uniform platelet dimensions since an excess of undesirably small platelets are produced by the fast, localized reaction at the solution-gas interface.

As previously indicated, the addition of DMSO to the aqueous reaction medium has the effect of delocalizing the reaction between the basic lead salt and carbon dioxide in the gaseous phase, apparently by increasing the solubility of the carbon dioxide in the aqueous reaction medium. It is suspected that this results from a lowering of the surface tension or by alteration of the dipole moment of the water. In any event the quality of the basic lead carbonate produced in accordance with the present process can be considerably improved by addition of DMSO to the aqueous reaction medium.

Basic lead carbonate pigments can be produced in accordance with this invention which are highly regular hexagonal crystal platelets having an average diameter within the range of about 10 to about 20 microns and an average thickness within the range of about 10 to about 80 millimicrons. More preferably, the resulting pigment will have an average diameter within the range of about 12 to about 18 microns and a thickness within the range of about 10 to about 50 millimicrons. As will be appreciated, the brilliance and luster of basic lead carbonate pigments which can be produced in accordance with this invention are greatly enhanced by virtue of the fact that the pearlescent effect is not unduly hindered by an over abundance of crystal platelets which are too small and/or too large to provide a maximum pearlescent effect. A very high quality synthetic pearl essence can thus be manufactured by practice of the present invention.

DETAILED DESCRIPTION OF THE INVENTION

Any suitable water-soluble basic lead salt can be employed in this invention for producing the pearlescent basic lead carbonate pigment. Nitric acid can be used to produce a suitable salt, but the preferred salts are produced by dissolving lead monoxide in an aqueous solution of an organic acid having the general formula:

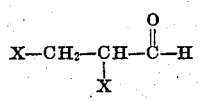

wherein X is a member of the group consisting of hydrogen, methyl and halogen. Organic acids that can be employed to advantage for making the basic lead salt include acetic acid, propionic acid, chloropropionic acid, isobutyric acid, and n-butyric acid.

The amount of dimethylsulfoxide which should be used in the present process is subject to variation depending upon the carbon dioxide addition rate, the concentration of the basic lead salt, the reaction temperature, and the like. As a general rule the anticipated improvement in reaction conditions is obtained when the aqueous reaction medium contains from about 0.10 to about 60 weight percent, based on the water, of DMSO; but in the majority of cases no further advantage is obtained at concentrations over about 10 weight percent and the most satisfactory results are usually obtained within the range of about 0.2 to about 5 weight percent. The optimum amount of DMSO which should be employed in any given case can be determined by conducting a few simple experiments guided by the good judgment of one skilled in the art.

In accordance with conventional practice, homogeneous distribution of the carbon dioxide throughout the solution of basic lead salt and DMSO can be facilitated by means of vigorous agitation. Furthermore, it is not necessary to maintain a critical temperature since the reaction can be carried out over the range which is already well known in the art, i.e., about 0° C to about 100° C. The reaction proceeds nicely at room temperatures and it can, therefore, be conveniently accomplished at temperatures below the decomposition point of the DMSO, e.g., within the range of about 5° C to about 40° C.

In the present process the lead content of the basic lead salt solution is preferably within the range of about 0.5 to about 7.0 weight percent although solutions which are somewhat more or less concentrated can also be employed. When first made up, the basic lead salt solution may have a content of lead which is somewhat higher than preferred, but a more dilute solution can be obtained simply by cutting back with water to achieve the concentration desired.

Prior to initiating the reaction, the solution of basic lead salt may be allowed to stand for several hours to allow small, solid particles of objectionable matter to grow or coalesce to a larger size. These particles should be then removed from the solution by filtering or decanting prior to introduction of the carbon dioxide since their presence can deleteriously affect formation and growth of the desired basic lead carbonate crystals.

In one embodiment of the invention, the aqueous solution of basic lead salt is merely placed in a vessel and the stream of diluted carbon dioxide is then bubbled through it at a rate whereby the pH of the solution is maintained above about 6.5 and more preferably is maintained within the range of about 6.8 to about 7.3. Accordingly, introduction of the carbon dioxide into the solution is terminated when the pH thereof can no longer be maintained above 6.5, and more preferably is terminated at a pH which is no lower than about 6.8.

In another and more preferred embodiment of the invention, a stream of the basic lead salt solution is introduced into an agitated body of water which contains the DMSO while a stream of diluted carbon dioxide is introduced into the aqueous solution of DMSO coextensively with the salt solution. This separate, agitated solution of DMSO in water thus serves as the reaction medium for the two streams being fed into it, i.e., the carbon dioxide and the salt solution. In these cases also, the pH of the aqueous medium is maintained above about 6.5 during the reaction, and more desirably is maintained within the range of about 6.8 to about 7.3. The pH of the aqueous medium can be adjusted, if necessary, during addition of the reaction streams by altering the flow rate of either stream to compensate for a change in pH effected by the other.

The reaction period for producing basic lead carbonate in accordance with the present invention is variable, but generally speaking the most desirable results are obtained by very slow reaction of the basic lead salt with carbon dioxide, i.e., a reaction time of at least about six hours. Since, however, the economic practicality of the process is to a large part dependent upon the production rate, an advantage is obtained by limiting the reaction time to a period of time which is within the range of about 6 to about 8 hours.

At the end of the reaction period the crystals of basic lead carbonate are allowed to settle out of the aqueous reaction medium. The resulting precipitate is drained off and centrifuged to produce an aqueous concentrate, or paste, of pigment grade basic lead carbonate which may then be marketed as such. Where preferred, the basic lead carbonate crystals can be placed instead into an organic solvent medium simply by vigorously mixing the aqueous concentrate with the solvent whereby the pigment is transferred, or "flushed" from the aqueous to the organic phase. In such a case, dioctylphthalate can be employed as the organic solvent to provide a pigment concentrate of about 50 to about 80 weight percent of pigment. In still other cases the aqueous paste of pigment can be demoisturized to provide a dry pigment. Procedures for drying the pigment are well known in the art, i.e., by means of an organic liquid drying agent such as an alcohol, an acetate, a ketone, or an ester.

When the reaction between carbon dioxide and the basic lead salt is carried out in accordance with the procedure described herein, crystal platelets of basic lead carbonate can be produced which are of a highly regular hexagonal shape and which have an average diameter within the range of about 10 to about 20 microns and an average thickness within the range of about 10 to about 80 millimicrons. By optimization and precise regulation of process conditions, pigments can be produced wherein the crystal platelets have an average diameter within the range of about 12 to about 18 microns and an average thickness within the range of about 10 to about 50 millimicrons. Produced accordingly, the pearlescent basic lead carbonate pigment is characterized by a brilliance and luster which equals or excells that of natural pearl essence.

While the present process can be practiced by introducing a concentrated stream of carbon 25 gas into the aqueous solution of basic lead salt and DMSO, the carbon dioxide can, to advantage, first be diluted with a gas which is substantially nonreactive with the basic lead salt. As described in copending application Ser. No. 83,185 filed Oct. 22, 1970, and assigned to the same assignee of this application, air, nitrogen or one of the inert gases can be used as a diluent gas since dilution of the carbon dioxide tends to delocalize its reaction with the basic lead salt and provides further control over crystal initiation and growth. At least 25 volume percent of the diluent gas can be mixed with the carbon dioxide to provide an advantage but higher concentrations are usually more advantageous, e.g., from about 50 to about 80 volume percent of the diluent gas, and higher, can be employed.

EXAMPLE I

Lead monoxide was dissolved in an aqueous solution of acetic acid to provide 20 gallons of basic lead salt solution having a content of lead of 12 weight percent. This solution was allowed to stand overnight, and the clear supernatent was then decanted off the residue which had settled out. The resulting purified solution of basic lead salt was then cut back with distilled water to a content of 3 weight percent. DMSO was added to this cutback solution to provide a concentration of 3 weight percent DMSO based on the water content of the solution.

A stream of carbon dioxide was then bubbled slowly into the solution of basic lead salt and DMSO while maintaining the temperature therein at about 25° C. The reaction mixture was maintained under agitation by means of a stirrer, and the feed rate of the carbon dioxide was regulated to maintain the pH of the mixture between about 6.5 and 7.5. When the mixture could no longer be maintained at a pH above 6.5, i.e., at the end of 6.5 hours, the feeding of carbon dioxide into the reaction mixture was stopped. A sample of the precipitated basic lead carbonate was then removed from the reactor for microscopic examination, and after the precipitate had settled it was drained off and centrifuged to provide a paste which contained less than 5 weight percent of water.

Microscopic examination of the basic lead carbonate produced in this experiment revealed regular hexagonal crystals of basic lead carbonate, the predominant portion of which had a diameter within the range of about 10 to about 20 microns and a thickness within the range of about 10 to about 80 millimicrons.

EXAMPLE II

Lead monoxide was dissolved in an aqueous solution of beta-chloropropionic acid to provide a solution wherein the content of lead was about 2 weight percent. The solution was then filtered to remove trace amounts of objectionable foreign matter. DMSO was then added to the solution to provide 5 weight percent of DMSO based on the water. While vigorously stirring the solution and maintaining it at about 65° C, carbon dioxide which had been diluted with 50 volume percent of air was bubbled into the solution. The feed rate of the diluted carbon dioxide stream was regulated to maintain the pH of the mixture between about 6.8 and 7.3. When the mixture could no longer be maintained above about 6.8, i.e., at the end of about 3.5 hours, introduction of the carbon dioxide was stopped. A sample of the precipitate was recovered for microscopic examination of the pigment. After being allowed to settle, the precipitate was passed to a centrifuge and was recovered therefrom as a paste containing less than 5 weight percent of water.

Microscopic examination of the crystal platelets of basic lead carbonate revealed that a pigment has been produced wherein about 70 percent of the platelets had a diameter within the range of about 10 to about 20 microns and a thickness within the range of about 10 to about 50 millimicrons.

EXAMPLE III 6.94 kilograms of lead monoxide and 1.772 kilograms of propionic acid were added to a tank which contained 113.7 liters of water at room temperature. This mixture was stirred until dissolution of the lead monoxide was completed. The resulting solution was allowed to stand overnight. The next morning, the clear, supernatent solution of basic lead salt was decanted into another tank which contained 114 kilograms of water and 475 grams of DMSO (about 0.4 percent DMSO). Feeding of carbon dioxide into the aqueous solution of DMSO was started at the same time. The carbon monoxide feedstream was diluted with 75 volume percent of air. In this case the input rate of the carbon dioxide stream was regulated to maintain the pH of the aqueous reaction medium within the range of about 7.2 to 7.3. The reaction temperature was maintained at about 25°C. At the end of 8 hours, the pH of the reaction medium fell to 6.8 and feeding of the carbon dioxide was stopped. A sample of the precipitate was then taken from the reaction tank for examination of the basic lead carbonate crystals. The precipitate was allowed to settle and was then drained out of the tank and centrifuged to produce an aqueous paste of the pigment. This was then mixed with dioctylphthalate and the mixture was vigorously agitated to effect flushing of the pigment into the organic solvent at a solids loading of 60 percent by weight.

Microscopic examination of the basic lead carbonate pigment produced in accordance with this experiment revealed highly regular hexagonal platelets, about 70 percent of which had a diameter within the range of about 12 to about 18 microns and a thickness within the range of about 10 to about 50 millimicrons.

EXAMPLE IV

The experiment of Example III was repeated using 3.3 weight percent of DMSO in the body of water into which the carbon dioxide and the basic lead salt solution were intorduced for reaction therein.

Examination of the crystal platelets produced in this experiment indicated a pigment of somewhat higher quality than was produced in Example III, i.e., about 80 percent of the crystal platelets had a diameter within the range of about 21 to about 18 microns and a thickness within the range of about 30 to about 50 millimicrons.

It should be pointed out that the basic lead carbonate pigments which are produced in accordance with this invention are specularly smooth, i.e., the surface is smooth with respect to the wavelength of light or light reflection. It is this specular reflection from the crystals which imparts a high degree of brilliance to the pigment.

It is believed that when basic lead carbonate crystals are grown too rapidly, as by the previously-described localized reaction of carbon dioxide with the basic lead salt, dislocations occur in the crystal lattice to such an extent that the crystals are not specularly smooth. Use of dimethyl sulfoxide in accordance with the present invention shows the growth rate of the basic lead carbonate crystals and reduces lattice dislocations, thus producing a more perfect crystal with a very smooth surface.

The present invention has been described with reference to particular materials, conditions, proportions, concentrations, and the like, but it will be understood that still other embodiments will become apparent which are within the spirit and scope of the invention which is defined in the appended claims.

Therefore, what is claimed is:

1. In a process for producing a pearlescent or nacreous basic lead carbonate pigment wherein a basic lead salt is reacted with carbon dioxide in the presence of an organic solvent, the improvement which comprises:
    a. mixing dimethylsulfoxide with water to form an aqueous solution thereof,
    b. coextensively introducing an aqueous stream of said basic lead salt and a stream of carbon dioxide gas into the aqueous solution of dimethylsulfoxide, and maintaining the pH of the dimethylsulfoxide solution above about 6.5 during the resulting reaction of the carbon dioxide with the basic lead salt.

2. The process of claim 1 in which the concentration of dimethylsulfoxide in the aqueous reaction medium is within the range of about 0.10 to about 60 weight percent.

3. The process of claim 1 in which the concentration of dimethylsulfoxide in the aqueous reaction medium is within the range of about 0.10 to about 10 weight percent.

4. The process of claim 1 in which the carbon dioxide is introduced into said aqueous reaction medium as a gaseous stream which is diluted with a gas that is substantially nonreactive with said basic lead salt.

5. The process of claim 1 in which said basic lead salt is produced by reacting lead monoxide with an aqueous solution of an organic acid having the general formula:

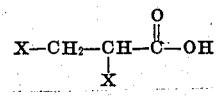

wherein X is a member from the group consisting of hydrogen, methyl and halogen.

6. The process of claim 5 in which said acid is acetic acid.

7. The process of claim 5 in which said acid is propionic acid.

8. The process of claim 5 in which said acid is betachloropropionic acid.

9. The process of claim 5 in which said acid is isobutyric acid.

10. The process of claim 5 in which said acid is n-butyric acid.

11. The process of claim 1 in which said basic lead salt is produced by reacting lead monoxide with an aqueous solution of nitric acid.

12. The process of claim 1 in which the content of lead in said aqueous solution of basic lead salt is within the range of about 0.5 to about 7.0 weight percent.

13. The process of claim 1 in which the temperature of said aqueous reaction medium is maintained within the range of about 0° C to about 100° C during reaction of the carbon dioxide with the basic lead salt.

14. The process of claim 1 in which said streams of basic lead salt solution and carbon dioxide are coextensively introduced into said solution of dimethylsulfoxide for a period of time within the range of about 6 to about 8 hours.

* * * * *